United States Patent
Tian et al.

(10) Patent No.: US 9,563,585 B2
(45) Date of Patent: Feb. 7, 2017

(54) SYSTEM AND METHOD FOR ISOLATING I/O EXECUTION VIA COMPILER AND OS SUPPORT

(71) Applicant: FutureWei Technologies, Inc., Plano, TX (US)

(72) Inventors: Chen Tian, Union City, CA (US); Handong Ye, Union City, CA (US); Ziang Hu, Union City, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 314 days.

(21) Appl. No.: 14/184,297

(22) Filed: Feb. 19, 2014

(65) Prior Publication Data
US 2015/0234640 A1   Aug. 20, 2015

(51) Int. Cl.
*G06F 13/24* (2006.01)
*G06F 9/45* (2006.01)

(52) U.S. Cl.
CPC .............. *G06F 13/24* (2013.01); *G06F 8/41* (2013.01); *G06F 8/451* (2013.01); *G06F 8/48* (2013.01)

(58) Field of Classification Search
CPC ........ G06F 11/3624; G06F 8/41; G06F 8/451; G06F 8/48
See application file for complete search history.

(56) References Cited

U.S. PATENT DOCUMENTS

| | | | |
|---|---|---|---|
| 9,170,812 B2* | 10/2015 | Vorbach | G06F 9/3001 |
| 2008/0256330 A1* | 10/2008 | Wang | G06F 8/447 |
| | | | 712/24 |
| 2009/0248988 A1 | 10/2009 | Berg et al. | |
| 2010/0153654 A1* | 6/2010 | Vorbach | G06F 12/0862 |
| | | | 711/137 |
| 2012/0216012 A1* | 8/2012 | Vorbach | G06F 8/443 |
| | | | 712/11 |
| 2013/0191817 A1* | 7/2013 | Vorbach | G06F 8/4441 |
| | | | 717/150 |

FOREIGN PATENT DOCUMENTS

CN   101770401 A   7/2010

OTHER PUBLICATIONS

Chang, F., et al., "Automatic I/O Hint Generation Through Speculative Execution," Proceedings of the 3rd Symposium on Operating Systems Design and Implementation, Usenix, Feb. 1999, pp. 1-15.

(Continued)

*Primary Examiner* — Ernest Unelus
(74) *Attorney, Agent, or Firm* — Slater Matsil, LLP

(57) ABSTRACT

Embodiments are provided for isolating Input/Output (I/O) execution by combining compiler and Operating System (OS) techniques. The embodiments include dedicating selected cores, in multicore or many-core processors, as I/O execution cores, and applying compiler-based analysis to classify I/O regions of program source codes so that the OS can schedule such regions onto the designated I/O cores. During the compilation of a program source code, each I/O operation region of the program source code is identified. During the execution of the compiled program source code, each I/O operation region is scheduled for execution on a preselected I/O core. The other regions of the compiled program source code are scheduled for execution on other cores.

18 Claims, 4 Drawing Sheets

(56) References Cited

OTHER PUBLICATIONS

IBM, "Boost Application Performance Using Asynchronous I/O," 11pages. Retrieved Feb. 5, 2014 from http://www.ibm.com/developerworks/library/l-async/.
Elmeleegy, K., "Lazy Asynchronous I/O for Event-Driven Servers," Proceedings of the Annual Conference on USENIX Annual Technical Conference, Jun. 27-Jul. 2, 2004, 14 pages.
Barney, B., Message Passing Interference (MPI), 35 pages. Retrieved Feb. 18, 2014 from file:///P:/docs/FW/FW-91004624US01/PA/44A0718.HTM.

* cited by examiner

US 9,563,585 B2

SYSTEM AND METHOD FOR ISOLATING I/O EXECUTION VIA COMPILER AND OS SUPPORT

TECHNICAL FIELD

The present invention relates to the field of computing, and, in particular embodiments, to a system and method for isolating Input/Output (I/O) execution via compiler and Operating System (OS) support.

BACKGROUND

In computing systems, I/O is a mechanism through which the main processing units including, processors and main memory, communicate with peripheral devices (also known as I/O devices) such as keyboard, mouse, disk or monitors. Due to the disparities of design, manufacture and connection method, I/O devices usually have lower performance compared to main memory when providing data to processors. Typical approaches of mixing I/O execution and non-I/O executions can lead to lower system throughput and degrade performance of computation-intensive processes, e.g., in server clusters such as cloud and data centers where high system throughput is expected, or in mobile devices where quality-of-service (QoS) of certain applications and power consumption are important. There is a need for a system and method that handle more efficiently I/O executions.

SUMMARY OF THE INVENTION

In accordance with an embodiment of the disclosure, a method by a multiple-core computing system for executing Input/Output (I/O) and non-I/O operations includes designating at least a portion of a plurality of processing cores as an I/O core, and compiling a program source code, wherein the compiling includes identifying each I/O operation region of the program source code. The program source code is then executed using the processing cores. The execution of the program source code includes scheduling the I/O operation region on the I/O. core In accordance with another embodiment of the disclosure, a method by a multiple-core computing system for executing I/O and non-I/O operations includes during compilation of a program source code, recognizing each I/O operation region of the program source code, and partitioning the I/O operation region from other regions of the program source code. The method further includes during execution of the compiled program source code, scheduling the I/O operation region for execution on a preselected I/O core, and scheduling the other regions of the compiled program source code for execution on other cores.

In accordance with yet another embodiment of the disclosure, a multiple-core computer for executing I/O and non-I/O operations comprises a plurality of processing cores and a non-transitory computer readable storage medium storing programming for execution by the at least one processor. The programming includes instructions to designate at least a portion of the processing cores as an I/O core, and compile a program source code. The instructions to compile the program source code include instructions to identify each I/O operation region of the program source code. The programming includes further instructions to execute the program source code using the processing cores. The instructions to execute the program source code include instructions to schedule the I/O operation region on the I/O core.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
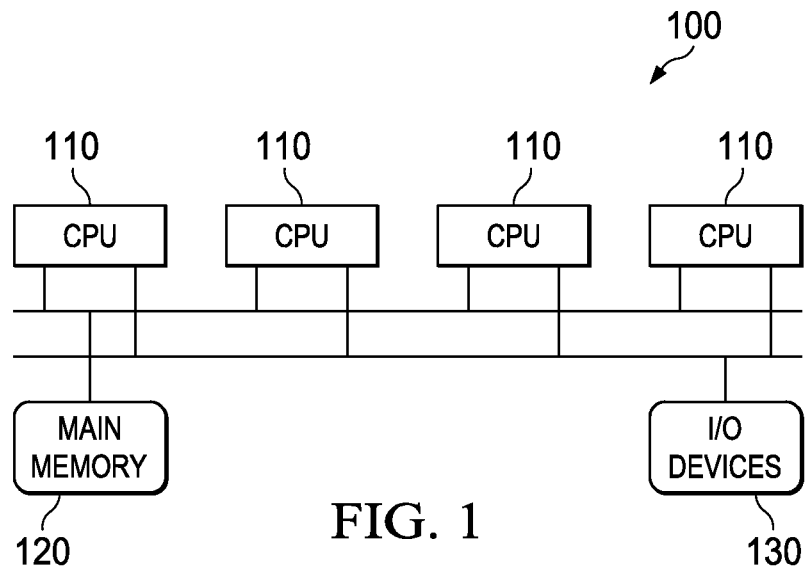
FIG. 1 illustrates a multicore processing system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Processors and I/O devices operate independently from a hardware point view, and thus synchronization mechanisms have to be introduced into the system to handle their operations. In general, there are two different synchronization methods between the processors and I/O devices operations. In a first method, a processor can execute a sequence of instructions in a process to periodically read or write status registers of a device until defined conditions are satisfied. For example, the condition can be an expected event taking place in a device, or a time slice of the current process becoming fully consumed, in which case a new process is switched in. This method is called polling. The second method is to allow a device to send a signal to processors when an event occurs. This signal interrupts the processor's current execution, and can invoke an OS scheduler to context-switch to the process that is interested in this event. The signal is also called interrupt. This interrupt-based method allows a processor to execute a process, which is not blocked, on I/O while putting a blocked process into an interrupt-waiting queue.

Although both methods improve processor utilization via the OS scheduler, putting a computation-intensive process and an I/O-intensive process on the same processor can degrade the performance of computation processes and system throughput. For example, in a polling-based system, an I/O process may waste a significant amount of time in polling before observing an expected I/O event. If the wasted time was allocated to non-I/O processes, the throughput of this processor would be largely improved. Further, the instructions executed in polling can lead to unnecessary power consumption.

In an interrupt-based system, on the other hand, every I/O interrupt causes the interrupt-receiving processor to pause current execution, jump to a corresponding interrupt handler, scan interrupt queues and call the scheduler when necessary. If a processor frequently receives I/O interrupts, executions of computation processes running on the same processor are constantly interrupted, which may lead to undesired performance. In the case of multicore or many-core processors, the situation can be even worse. For example, when a first core (core A) receives an interrupt, it spends a certain amount of time handling it. However, if the interrupt is expected by another process running on a second core (core B), core A either informs core B about the arrival of the interrupt or ignores the interrupt by determining if core B has already received the same interrupt. As a result, core A introduces considerable synchronization overhead at the software level or wastes its time.

In view of the above, mixing I/O execution and non-I/O execution can degrade the performance of computation-intensive processes and reduce system throughput, e.g., whether in server clusters such as cloud and data centers where high system throughput are expected, or in mobile devices where QoS of certain applications and power consumption are important. To overcome the shortcomings of the above methods, embodiments are provided herein for isolating I/O execution by combining compiler and OS techniques. The embodiments include dedicating selected cores, in multicore or many-core processors, as I/O execution cores, and applying compiler-based analysis to classify I/O regions of processes (program code) so that the OS can schedule those regions onto the designated I/O cores. The scheme comprises three steps: I/O core construction by the OS, I/O region classification by the compiler, and I/O region scheduling by the OS. The compiler analysis allows the I/O regions in an application to be accurately located, and useful information to be effectively extracted and passed to the OS scheduler. This can lead to a better scheduling decision and thus improve throughput and performance.

The compiler can also provide detailed information to the OS about the operations in an I/O region. The above information is added as parameters in the instructions using pragmas (programming language directives). For instance, the compiler can use system call analysis, a defined cost model, and underlying system resources (e.g., number of processors/cores, available memory, power, networking bandwidth, or other resources) to determine for each region the number of I/O operations, the types of resources and the number of each type of resource as required, and/or the preferred dedicated I/O core. The combined compiler and scheduler scheme improves the performance of computation intensive application by reducing I/O related interferences on executions. This can also lead to a higher system through-put. Another advantage is enabling a smarter I/O scheduling on I/O regions, which are extracted from different processes or threads by the compiler. This can potentially lead to higher throughput on I/O executions. The scheme also allows reducing power consumption on I/O cores by taking advantage of application specific information passed from compiler.

FIG. 1 shows a general multicore computer system 100. The system 100 includes a plurality of processors (e.g., CPUs) or processor cores 110, each connected to a main memory 120 (e.g., a random access memory (RAM)) via a first bus, and to one or more I/O devices 130 via a second bus. Examples of I/O devices 130 include displays, keyboards, computer mice, printers, hard disk drives, solid state drives (flash disks) or other I/O devices. Any of the processors or cores 110 may execute, at an instance of time, I/O instructions or non-I/O instructions. The execution of non-I/O instructions includes exchanges between the processors/cores 110 and memory 120. The processor/core operations are typically faster than the memory operations. Thus, to handle the non-I/O instructions more efficiently (reduce processing time), the system 100 can also use cache memory that has faster operation time than the memory 120. The execution of I/O instructions includes exchanges between the processors/cores 110 and I/O devices 130 and using I/O memory or direct memory access (DMA). As described above, execution of I/O and non-I/O instructions at the processors/cores 110 can be synchronized using the interrupt or polling method.

In the interrupt method, the system 100 also uses an Advanced Programmable Interrupt Controller (APIC). Each I/O interrupt stops the running application at an arbitrary point. The interrupt is initiated by an I/O device 130 via the second bus (e.g., a peripheral component interconnect (PCI) bus) to the APIC. The APIC then uses an interrupt descriptor table (IDT) to trigger a suitable interrupt handler, which then communicates with an I/O device driver to complete the I/O instruction execution, e.g., an I/O read or write command. When the I/O execution ends, the system returns to the interrupted application execution (non-I/O execution). This scheme can cause frequent interruption (pausing) of running programs off a processor/core 110, which affects CPU and memory bound applications.

Figure 2:
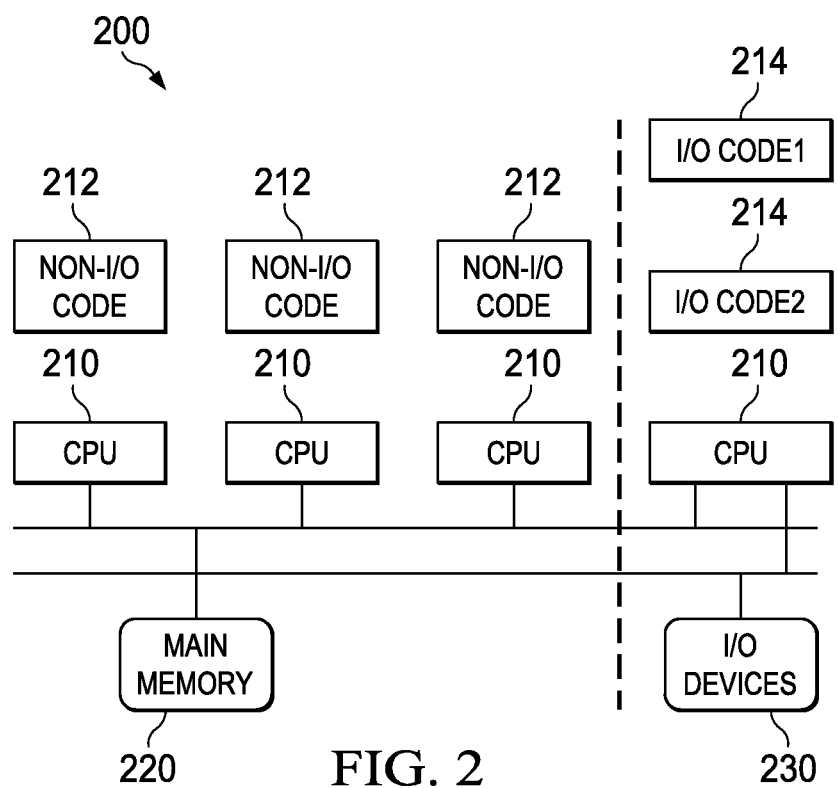
FIG. 2 illustrates an embodiment of an improved processing system.

FIG. 2 shows an embodiment of an improved multicore system 200 that resolves having the application/program execution frequent interruptions, and hence improves execution performance. The system 200 includes a plurality of processors (CPUs) or cores (in a CPU) 210. The processors/cores 210 are connected to a main memory 220 via a first bus, and to one or more I/O devices 230 via a second bus. Additionally, one or more of the processors/cores 210 is dedicated as an I/O execution core. The dedicated processor(s)/core(s) 210 can change with time, e.g., according to work load of the processors/cores 210 or application requirements. The dedicated processor/core 210 is used to execute the I/O codes 214 (I/O code 1 and I/O code 2) for one or more threads or processes, while the remaining processors/cores 210 are used to execute the non-I/O codes 212. An I/O code 214 on the dedicated I/O processor/core 210 and a non-I/O code 212 on any remaining (non-I/O dedicated) processor/core 210 can belong to the same application or process thread.

To separate the execution of the I/O regions from non-I/O regions in process threads, the I/O interrupts (from the I/O devices 230 or APIC) are masked from, or otherwise blocked from or made transparent to, the non-IO processors/cores 210. As such, the dedicated I/O processor/core 210 is configured to receive all the I/O interrupts. An OS scheduler schedules the non-I/O regions of the threads onto the non-I/O cores and schedules the I/O regions onto the I/O core.

As described above, an I/O core is capable of receiving I/O device interrupts. I/O interrupts can be sent from I/O devices to the processor or core through an interrupt request (IRQ) controller. An example of an IRQ controller is the Intel 8259 chip based on the x86 architecture, which has 8 input pins. Two such chips can be chained together to provide a total of 16 IRQ signals. These 16 signals are mapped to 16 interrupt vectors in the interrupt descriptor table defined by the OS. More advanced IRQ controllers can also be used for the multicore system 200, such as the Intel APIC system for the x86 architecture. For instance, the system 100 can include a local APIC and an I/O APIC, which allows the OS to configure where each I/O interrupt is routed to through which pin. In the case of message signaled interrupt (MSI) devices, where signal is not sent through pin but through memory writing interception, the destination of an interrupt is determined by the memory address in the writing operation. The OS can also decide which core is responsible for what interrupts.

The availability of programmable IRQ controllers provides the opportunity to dedicate a portion or subset of cores in a multicore or many-core platform to I/O operations. In an embodiment, the IRQ controller of each core is programmed to allow only selected cores to receive I/O interrupts. In a first step, when booting up, the OS selects a portion or subset of cores as I/O cores. The portion can be defined as a fixed number of cores, a percentage of core total capacity, or a combination of both. The portion can also be dynamically determined based on heuristics, such as I/O workload, system throughput, or other relevant system/application parameters or requirements. The interrupts controllers of all cores are set to ignore all I/O interrupts at this step. In a second step, when loading a device driver, the OS turns on the interrupt handling capability on one or more I/O cores. This involves registration of an interrupt handler and ensuring interrupts from the device are routed to these cores. For IRQ based devices, the OS configures the IRQ controllers to unmask corresponding pins on these I/O cores so that interrupts from such devices can be captured. For MSI based devices, the OS configures the devices so that any interrupt-raising memory operations have correct destination addresses. By following these two steps, all I/O interrupts are guaranteed to arrive at I/O cores. Consequently, all non-I/O cores do not respond to I/O interrupts. This substantially reduces the amount of interruption in user applications running on these cores.

Figure 3:
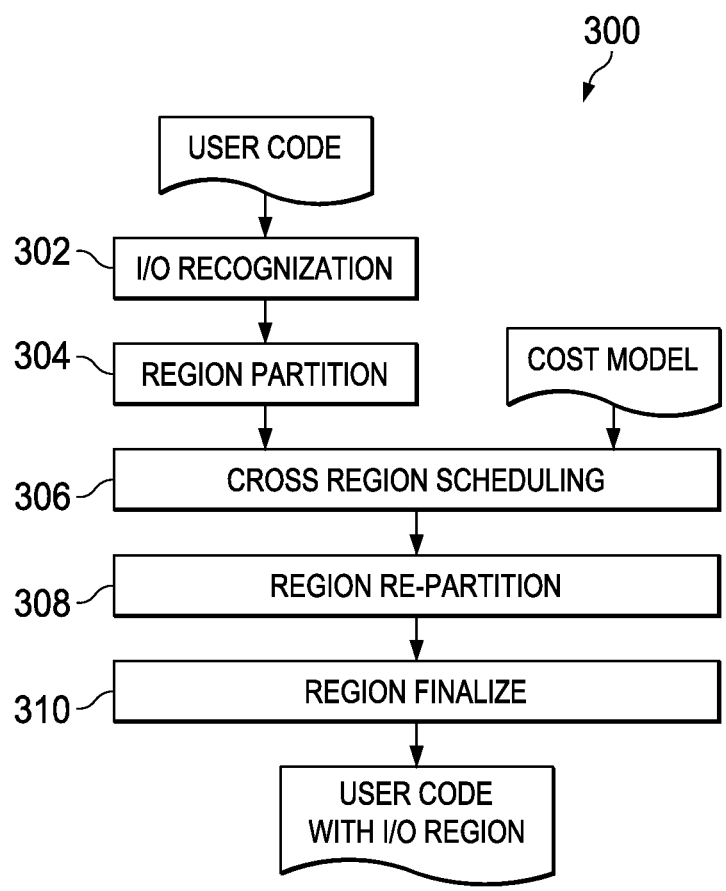
FIG. 3 illustrates an embodiment of a compiler scheme for handling I/O executions.

The I/O and non-I/O regions of code or program instructions are classified by a compiler, before executing the instructions. FIG. 3 shows an embodiment of a compiler scheme 300 for handling I/O executions. In the source code of a program, if a piece of code contains multiple I/O requests, or interrupts, it can cause intensive I/O operations. This is referred to herein as an I/O region. The I/O region is the target code for the I/O core to execute. During program compiling, this region is identified and the beginning of the region is annotated or marked by the compiler with IO_REGION_START or any suitable indication text. The end of the region is annotated by IO_REGION_END or any suitable indication text. Both IO_REGION_START and IO_REGION_END are pragmas or directives, which the compiler later translates to a specific OS system call. The system calls in turn instruct the scheduler to move this I/O region into the I/O core, as described above. The compiler has two roles. First, the compiler identifies the I/O operations. The compiler then splits the code into a sequence of blocks, each block is then classified as I/O intensive or not. For I/O intensive blocks, the two pragmas above are inserted accordingly.

Programmers may not be aware that some of the code causes I/O requests. As such, typically the I/O operations are spread randomly in the code, which can have undesired consequences. For example, there may be too many I/O regions, which are relatively small, resulting in the I/O scheduler getting busy sending tasks to the I/O core. To alleviate this, the compiler performs a heuristic optimization, which considers the size of I/O regions and non-I/O regions, the number of I/O requests and the corresponding estimated execution time in an I/O region, and the estimated execution time of a non-I/O region. Based on such analysis, the compiler performs necessary code scheduling to create better balance between the I/O regions and non-I/O regions.

Figure 4:
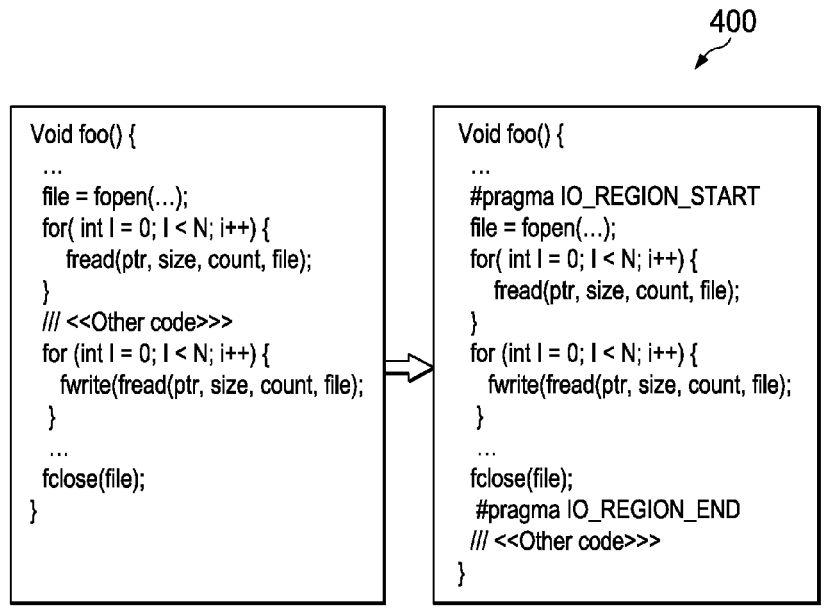
FIG. 4 illustrates an example of compiling program instructions for isolating I/O executions.

After the I/O recognition step 302 in the compiler scheme 300, the original code is partitioned into I/O regions and non-I/O regions at step 304. The compiler can perform a partitioning algorithm based on a ratio equal to the number of I/O operations to the number of statements in a piece of code. If the ratio is over a defined threshold, this piece of code is considered an I/O region. When the piece of code contains a loop, the loop count is taken into account, which means the number of I/O operations and number of statements are actually dynamic numbers. After the region partition step 304, a cross region scheduling step 306 is implemented according to a cost model. The cost model indicates the average runtime cost of each I/O operation, and each normal (non-I/O) statement. During cross region scheduling, the compiler moves the code from I/O regions to non-I/O regions, or from non-I/O regions to I/O regions, based on the cost model and current partitioning. The goal of this scheduling is to create load balance between I/O regions and non-I/O regions. For example, for an I/O region which takes one thousand cycles at runtime, the compiler makes the following non-I/O region N thousand cycles long. The integer N is decided by the available resources (e.g., available cores, memory, power, or other resources) in the multi-core system. Next, at the region re-partition step 308, the compiler merges any consecutive I/O regions or consecutive non-I/O regions, or splits a region into two separate regions. The merging or splitting of regions is decided by the available resources in the system. In a subsequent region finalizing step 310, the compiler inserts the pragmas in each region, and optionally further inserts parameters indicating the number of I/O operations and the estimated runtime cycles. FIG. 4 shows an example of program instructions before and after using the compiling scheme 300.

Figure 5:
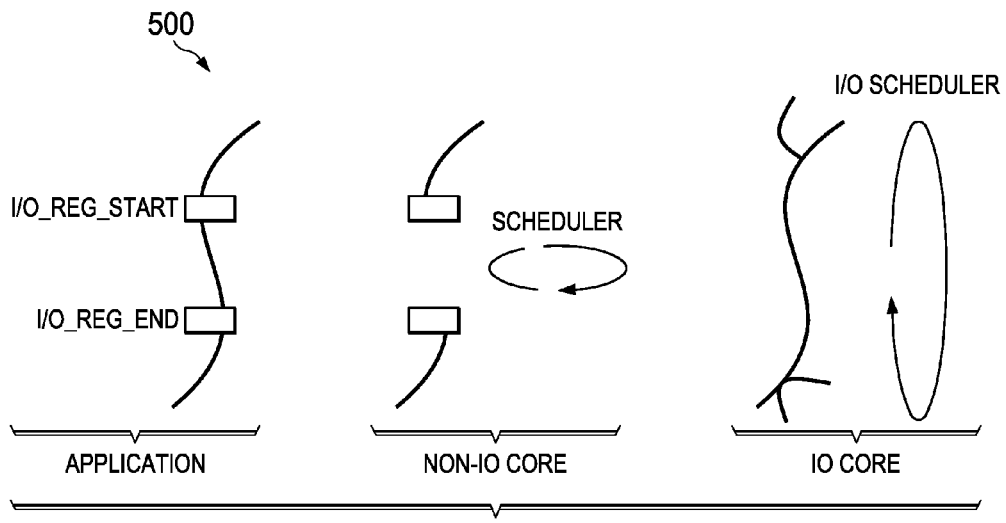
FIG. 5 illustrates an embodiment scheme of OS scheduling for handling I/O executions.

FIG. 5 shows an embodiment scheme 500 for OS scheduling, upon executing the compiled source code or program by the compiler scheme 300. When I/O_REGION_START and I/O_REGION_END calls in a program are executed on an I/O core, the OS scheduler is invoked. The scheduler is configured to move all I/O regions to the I/O cores, and create a separate I/O region scheduler to schedule these regions. Upon an I/O_REGION_START call, the current process (or thread) is moved from the ready queue of the original scheduler to the I/O scheduler. Upon an I/O_REGION_END call, the active process (or thread) is moved back from the I/O scheduler to the original scheduler, which schedules the process to one of the non-I/O cores.

Figure 6:
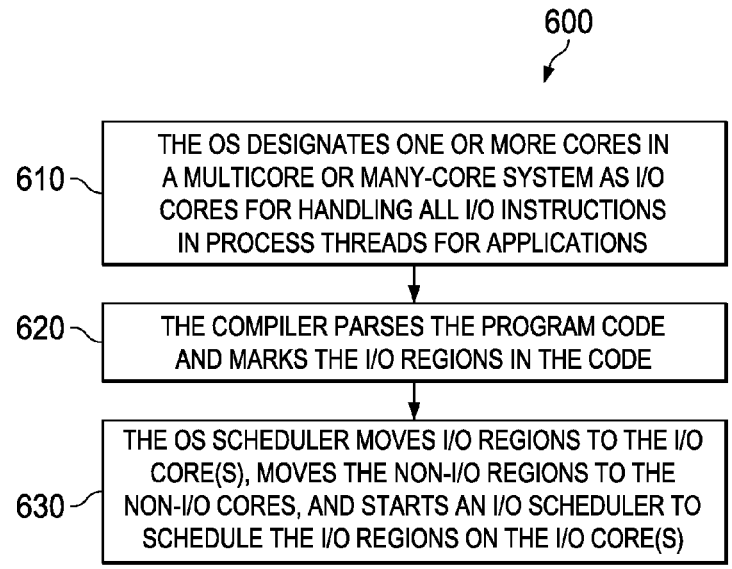
FIG. 6 illustrates an embodiment of a method for isolating and handling I/O execution via compiler and OS support.

FIG. 6 shows an embodiment method 600 for isolating I/O execution from non-I/O execution in a multicore system, using compiler and OS support. At step 610, the OS designates one or more cores in a multicore or many-core system as I/O cores for handling all I/O instructions in process threads for applications. The I/O cores can be fixed or change dynamically according to changing heuristics (or system statistics). At step 620, the compiler parses the program code and marks the I/O regions in the code. The I/O determination can include considering I/O intensive operations and cost (e.g., runtime cost). At step 630, the OS scheduler moves I/O regions to the I/O core(s), and moves the remaining regions to the non-I/O dedicated cores. The non-I/O regions may still include some I/O calls that are less intensive in comparison to the I/O regions, and therefore may not cause frequent interruptions to the non-I/O cores. When, an I/O region is encountered, the OS scheduler also starts an I/O scheduler to schedule the I/O regions on the I/O cores with more efficiency.

The I/O scheduler is a separate scheduler that makes scheduling decisions for all I/O regions from different processes. Different algorithms and heuristics can be applied to further improve system throughput. By default, each region can be handled in a round-robin fashion. Moreover, the I/O_REGION_START call can also pass suitable information to facilitate the I/O scheduler and optimize implementation. For example, if two I/O regions from different processes are expecting two different events from the same device, and two events have some correlation in terms of occurrence (e.g., unlikely to happen together), the I/O scheduler can apply smarter scheduling by scheduling the two regions onto one I/O core and respecting the correlation.

Additionally, the I/O scheduler can reduce power consumption on I/O cores in suitable scenarios. For example, the I/O schedule can lower the frequency of some I/O region execution if the corresponding device's response is too slow. If necessary, the I/O scheduler can also lower the frequency of some I/O cores to further reduce power consumption.

Figure 7:
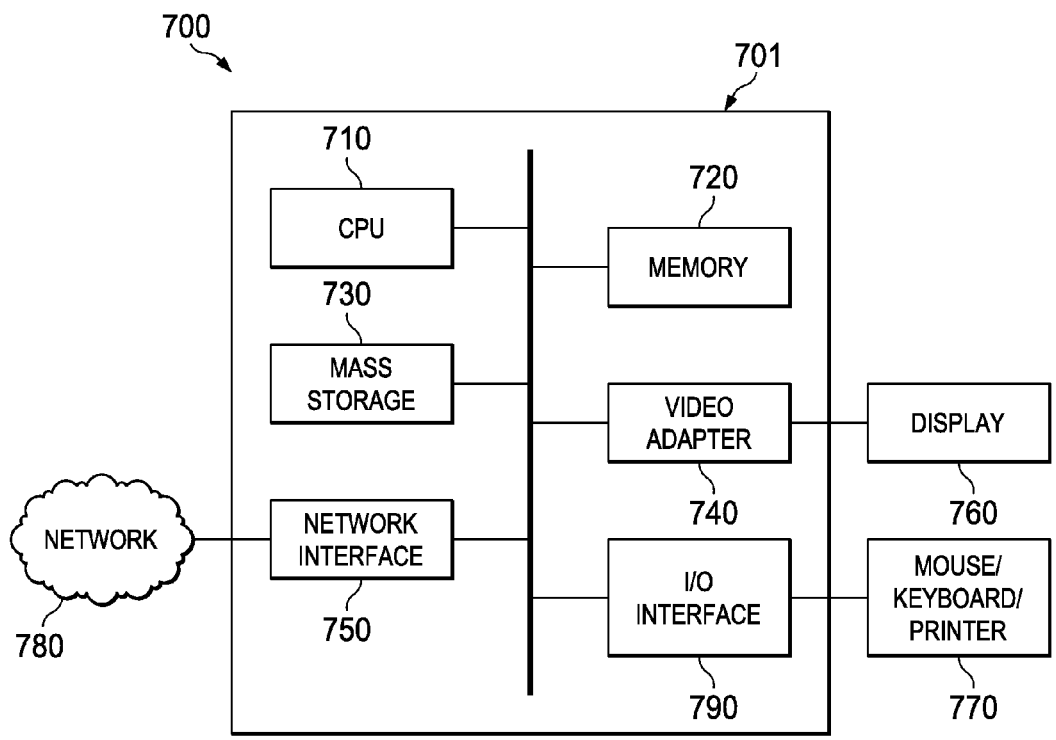
FIG. 7 illustrates a processing system that can be used to implement various embodiments.

FIG. 7 is a block diagram of an exemplary processing system 700 that can be used to implement various embodiments. For example, the processing system can be part of a server, a data center, a mobile or user device, or a network component. The processing system 700 may comprise a processing unit 701 equipped with one or more input/output devices, such as a speaker, microphone, mouse, touchscreen, keypad, keyboard, printer, display, and the like. The processing unit 701 may include a central processing unit (CPU) 710, a memory 720, a mass storage device 730, a video adapter 740, and an Input/Output (I/O) interface 790 connected to a bus. The bus may be one or more of any type of several bus architectures including a memory bus or memory controller, a peripheral bus, a video bus, or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The video adapter 740 and the I/O interface 790 provide interfaces to couple external input and output devices to the processing unit. As illustrated, examples of input and output devices include a display 760 coupled to the video adapter 740 and any combination of mouse/keyboard/printer 770 coupled to the I/O interface 790. Other devices may be coupled to the processing unit 701, and additional or fewer interface cards may be utilized. For example, a serial interface card (not shown) may be used to provide a serial interface for a printer.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a multiple-core computing system for executing Input/Output (I/O) and non-I/O operations, the method comprising:

designating at least a portion of a plurality of processing cores as an I/O core;

compiling a program source code, wherein the program source code comprises an I/O operation region of the program source code and other regions of the program source code, and wherein the compiling includes identifying the I/O operation region of the program source code, including:

inserting pragmas in the I/O operation region for the execution, wherein the pragmas mark the I/O operation region, and inserting, in the I/O operation region, parameters indicating a number of I/O operations and a number of estimated runtime cycles to a scheduler for the execution; and executing the program source code using the plurality of processing cores, wherein the executing includes scheduling the I/O operation region only on the I/O core and not on a non-I/O core of the plurality of processing cores.

2. The method of claim 1, wherein the designating includes:
   setting interrupt controllers of the plurality of processing cores to ignore I/O interrupts;
   selecting the I/O core upon booting an operating system (OS); and
   turning on an interrupt handler for the I/O core upon loading a driver for an I/O device.

3. The method of claim 2, wherein turning on the interrupt handler for the I/O core includes configuring an interrupt request (IRQ) controller to unmask corresponding pins on the I/O core, and wherein unmasking the corresponding pins on the I/O core allows capturing the I/O interrupts by the I/O core.

4. The method of claim 2, wherein turning on the interrupt handler for the I/O core includes configuring interrupt-raising memory operations at the I/O device with correct destination addresses.

5. The method of claim 1, wherein designating at least the portion of the plurality of processing cores includes selecting a fixed number of cores of the plurality of processing cores or a percentage of core total capacity of the plurality of processing cores as the I/O core.

6. The method of claim 1, further comprising reselecting the I/O core from the plurality of processing cores dynamically according to I/O workload, system throughput, or other system statistics.

7. The method of claim 1, wherein the compiling further includes marking the I/O operation region in the compiled program source code by inserting, at a start and end of the I/O operation region, pragmas annotating the start and end of the I/O operation region, and wherein the executing includes translating the pragmas into system calls instructing an operating system (OS) scheduler to move the execution of the I/O operation region to the I/O core.

8. The method of claim 1, wherein the I/O operation region is identified in accordance with at least one of: sizes of the I/O operation region and other regions of the program source code, a number of I/O requests in the I/O operation region, and estimated execution times of the I/O operation region and the other regions of the program source code.

9. The method of claim 1, wherein the I/O operation region includes intensive I/O operations in comparison to other regions of the program source code.

10. A method by a multiple-core computing system for executing Input/Output (I/O) and non-I/O operations, the method comprising:
   during compilation of a program source code, recognizing an I/O operation region of the program source code;
   partitioning the I/O operation region from other regions of the program source code, including:
      inserting pragmas in the I/O operation region for the execution, wherein the pragmas mark the I/O operation region, and
      inserting, in the I/O operation region, parameters indicating a number of I/O operations and a number of estimated runtime cycles to a scheduler for the execution;
   during execution of the compiled program source code, scheduling the I/O operation region for execution only on a preselected I/O core and not on a non-I/O core, wherein a plurality of processing cores comprises the preselected I/O core and the non-I/O core; and
   scheduling the other regions of the compiled program source code for execution on the non-I/O core.

11. The method of claim 10, wherein recognizing the I/O operation region of the program source code includes:
   calculating a ratio of a number of I/O operations to a number of statements in a piece of the program source code; and
   upon determining that the ratio is above a defined threshold, designating the piece of the program source code as the I/O operation region.

12. The method of claim 10, wherein the I/O operation region is partitioned according to a cost model indicating an average runtime costs of the I/O operation and non-I/O statements of the program source code, and wherein partitioning the I/O operation region from the other regions of the program source code according to the cost mode satisfies load balance between the I/O core and the non-I/O core.

13. The method of claim 10, further comprising, during the compilation, merging consecutive I/O operation regions or other regions of the program source code according to available system resources.

14. The method of claim 10, further comprising, during the compilation, splitting the I/O operation region and the other regions of the program source code according to available system resources.

15. The method of claim 10, wherein scheduling the I/O operation region for execution on the preselected I/O core includes creating an I/O operation region scheduler to schedule the I/O operation region.

16. A multiple-core computer for executing Input/Output (I/O) and non-I/O operations, the multiple-core computer comprising:
   a plurality of processing cores; and
   a non-transitory computer readable storage medium storing programming for execution by at least one processing core of the plurality of processing cores, the programming including instructions to:
      designate at least a portion of the plurality of processing cores as an I/O core;
      compile a program source code, wherein the program source code comprises an I/O operation region of the program source code and other regions of the program source code, and wherein the instructions to compile the program source code include instructions to identify an I/O operation region of the program source code, wherein the instructions to identify the I/O operation region of the program source code include instructions to:
         insert, at a start and end of the I/O operation region, pragmas annotating the start and end of the I/O operation region; and
         insert, in the I/O operation region, parameters indicating a number of I/O operations and a number of estimated runtime cycles to a scheduler; and
      execute the program source code using the plurality of processing cores, wherein the instructions to execute the program source code include instructions to schedule the I/O operation region only on the I/O core and not on a non-I/O core of the plurality of processing cores.

17. The multiple-core computer of claim 16, wherein the instructions to designate at least the portion of the plurality of processing cores as the I/O core include instructions to:
   set interrupt controllers of the at least a portion of the plurality of processing cores to ignore I/O interrupts;
   select the I/O core upon booting an operating system (OS); and
   turn on an interrupt handler for the I/O core upon loading a driver for an I/O device.

18. The multiple-core computer of claim 16, wherein the instructions to execute the program source code includes instructions to:
 invoke an operating system (OS) scheduler for scheduling execution of the compiled source code on the plurality of processing cores; and
 creating an I/O operation region scheduler for scheduling the I/O operation region on the I/O core.

\* \* \* \* \*